United States Patent [19]
Bishop et al.

[11] Patent Number: 5,303,563
[45] Date of Patent: Apr. 19, 1994

[54] VEGETABLE CRISPER

[75] Inventors: Jerry W. Bishop; Stephen W. Braun; Lee Payne, Jr., all of Atlanta, Ga.

[73] Assignee: Hydro-Crisper, Inc., Atlanta, Ga.

[21] Appl. No.: 911,186

[22] Filed: Jul. 9, 1992

[51] Int. Cl.$^5$ ............................................. F25D 25/02
[52] U.S. Cl. ........................................ 62/382; 62/285; 62/291; 312/402
[58] Field of Search ............... 62/382, 376, 285, 291; 312/402

[56] References Cited

U.S. PATENT DOCUMENTS

| | | | |
|---|---|---|---|
| 2,411,833 | 11/1946 | McMahon | 62/141 |
| 2,470,551 | 5/1949 | Fish | 62/141 |
| 2,560,057 | 7/1951 | Williams | 62/103 |
| 2,812,643 | 11/1957 | Worschitz | 62/104 |
| 3,364,694 | 1/1968 | Cohen et al. | 62/265 |
| 3,448,589 | 6/1969 | Marshall et al. | 62/376 |
| 3,600,905 | 8/1971 | Dymek | 62/382 |
| 3,834,178 | 9/1974 | Pink | 62/338 |
| 4,013,434 | 3/1977 | Kronenberger et al. | 62/382 |
| 4,860,555 | 8/1989 | Bishop et al. | 62/382 |

Primary Examiner—Ronald C. Capossela
Attorney, Agent, or Firm—Kennedy & Kennedy

[57] ABSTRACT

A sprayer seated on at least a portion of the upper periphery of a vegetable crisper and periodically supplied with pressurized fluid for emitting through at least one orifice a spray over the vegetables held within the crisper for maintaining the freshness thereof. The sprayer preferably is an elongated ribbon-like member having a plurality of orifices and which cooperatively forms at least a partial seal between the upper peripheral edge of the crisper and a removable top.

25 Claims, 6 Drawing Sheets

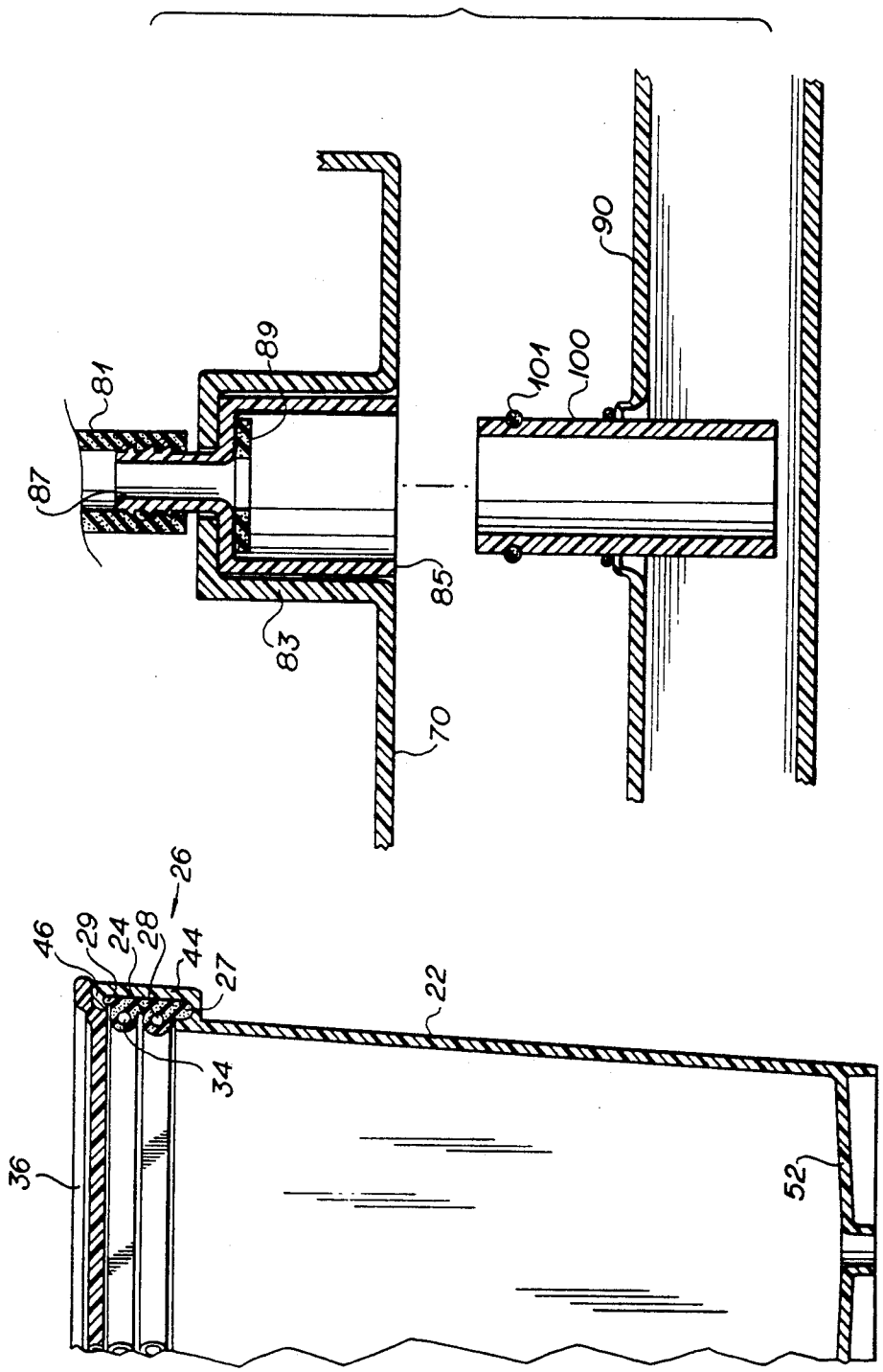

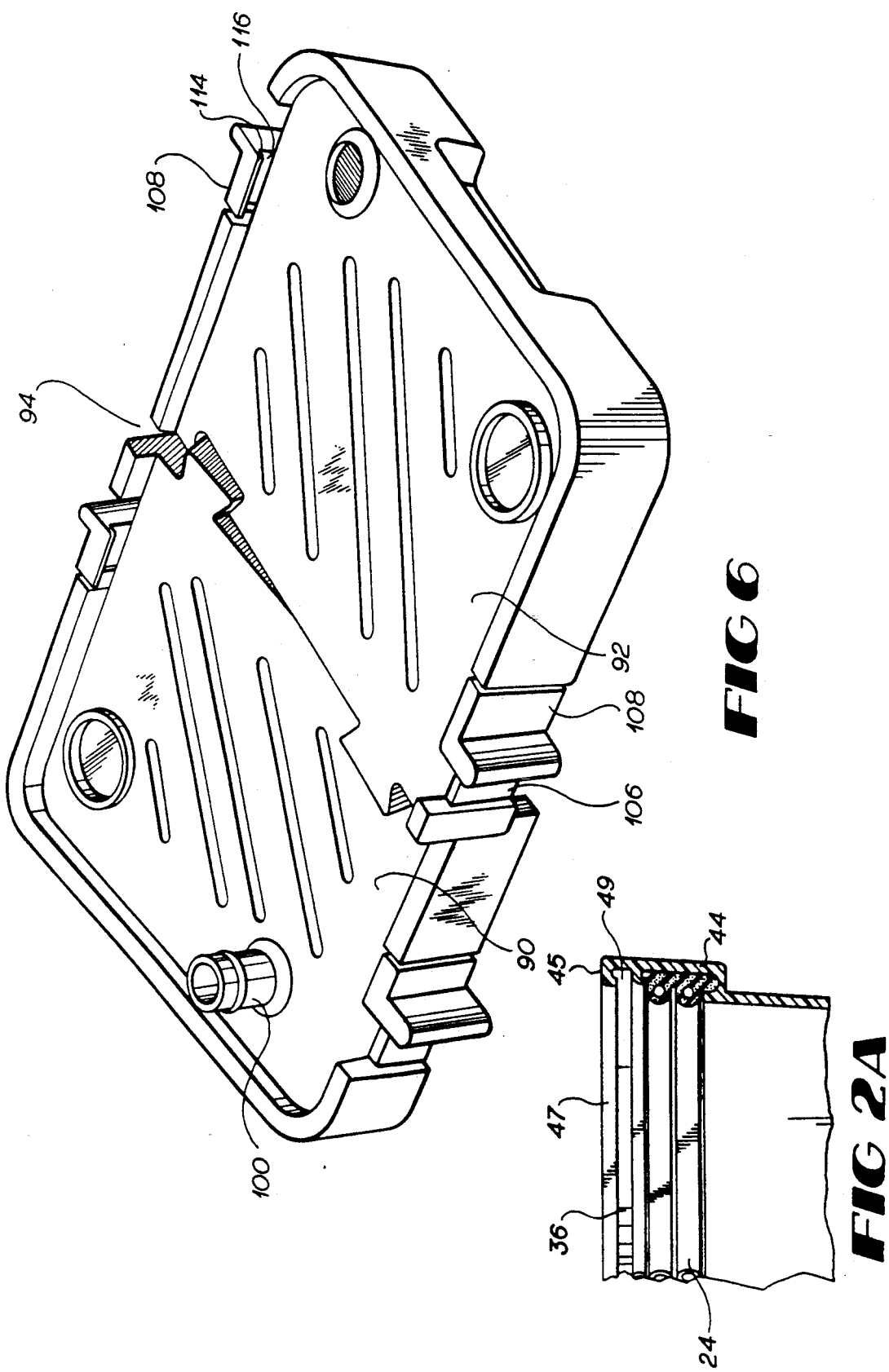

VEGETABLE CRISPER

TECHNICAL FIELD

The present invention relates to apparatus for storing fresh vegetables. More particularly, the present invention relates to a peripheral sprayer for an apparatus for storing vegetables to maintain freshness.

BACKGROUND OF THE INVENTION

Refrigeration has long been recognized as a primary mechanism for maintaining the freshness of vegetables. The cool air of a refrigerator or refrigerated container slows the biological and chemical process of decay. Temperature control however is but one facet of maintaining vegetables fresh. Dehydration is a principle mechanism of deterioration in quality and taste of stored refrigerated vegetables. The cool air, which is relatively dry, readily absorbs the water that transpires from the vegetables. The root system for a plant continually replaces such lost moisture. Once vegetables are harvested from a plant, however, it is important to minimize the loss of moisture while keeping the vegetables cool in order to maintain freshness.

Efforts have been made to reduce the loss of moisture from fresh vegetables held in cool rooms or refrigerators. For example, U.S. Pat. No. 4,860,555 issued to Bishop et al discloses a vegetable crisper comprising a container for receiving vegetables and adapted to sprinkle water periodically from a supply onto the vegetables. The sprinkler is mounted centrally within the container on a lower floor and projects upwardly to a position beneath the lid. A recirculation system filters the water within the container.

While such vegetable crisper successfully increases the storage life of fresh vegetables held in a refrigerator, the centrally disposed sprinkler presents several problems that reduce the usefulness of the crisper. The sprinkler interferes with access by a user into the container to place or to retrieve a particular vegetable. The sprinkler also occupies space in the container, which would otherwise be available for holding vegetables. The centrally disposed sprinkler may prevent storage of large vegetables which often must be cut into smaller pieces to fit in the container. Such cutting exposes additional surface area of the vegetable to cool air which leads to increased fluid loss from the vegetable with resultant loss of freshness. Also, the centrally disposed sprinkler requires routing a fluid communication tube from a side of the container into the center. Placing and storing vegetables in the container could interfere with the tube and possibly prevent the sprinkler from functioning as desired. Finally, there is no provision for only single use of the fluid sprayed on the vegetables. The reservoir initially holds fresh fluid, but as the apparatus operates, sprayed fluid flows from the vegetables back into the reservoir. Although a filter is provided, it is desirable that such used fluid be collected separately for disposal, so that materials that may be dislodged from the vegetable are not carried into the fresh supply of fluid.

Accordingly, there is a need in the art for an apparatus for maintaining the freshness of vegetables while providing increased access thereto, for using space in the container more efficiently to hold vegetables, for reducing interference between the vegetables and the apparatus during use, and for collecting spray fluid separately for disposal.

SUMMARY OF THE INVENTION

The present invention provides a vegetable crisper which overcomes the problems found in prior vegetable-holding apparatus. In particular, the vegetable crisper of the present invention comprises a chamber for holding vegetables and a reservoir attached thereto for a supply of a fluid, such as water. A sprayer attaches to an upper peripheral edge of the chamber. The sprayer faces the interior of the chamber, in which space vegetables may be placed. In one aspect of the present invention, the sprayer defines a plurality of orifices spaced along at least a portion of the upper peripheral edge. Means are provided for selectively communicating the fluid from the reservoir to the sprayer for emission as a mist from the orifices. Vegetables sprayed with the mist are thereby wetted to maintain freshness. A removable lid positioned on the upper periphery closes the open end of the chamber and provides access to the vegetables.

More particularly described, the sprayer of the preferred embodiment comprises a flexible extruded tube which is attached to the upper periphery edge of the chamber and receives thereon the lid to close the chamber. The tube communicates with the reservoir, and receives a supply of fluid under pressure. The tube then emits the fluid through a plurality of orifices as a mist over the vegetables in the chamber.

More particularly described, the extruded sprayer includes a second tube which contains air. The sprayer is resistant, and the air tube cushions the seating of the lid on the chamber.

In another aspect of the present invention, a sprayer head is attached to a side of the container and communicates with a supply of fluid. The sprayer head includes at least one orifice for emitting a spray across the container to wet vegetables in the container. The lid seats on the upper peripheral edge of the container, which can receive a ribbon-like gasket to seal at least partially the gap between the lid and the container.

In another aspect of the present invention, a second reservoir attaches to the chamber for receiving the fluid that collects on a bottom surface of the chamber. A tab and latch facilitates removal of the second reservoir for disposal of the fluids emitted over the vegetables.

More particularly described, the first reservoir and the second reservoir interlock together with tongue and groove joints. A plurality of latches operatively attached to the reservoirs engage catches on the vegetable holding chamber for detachably securing the reservoirs thereto.

In another aspect of the present invention, the apparatus is adapted for insertion into a vegetable drawer of a refrigerator. The reservoir holds a supply of fluid that is communicated to a sprayer that mounts at an upper end of a housing on the reservoir. The vegetables sit on a false bottom that is disposed above the upper surface of the reservoir. The false bottom defines a collection area therebelow for a fluid that drains from the wetted vegetables.

More particularly described, the false bottom of the insertable vegetable crisper is expandable to cover the different sized bottom areas of vegetable drawers in refrigerators made by different manufacturers. Slidable plates on the false bottom move outwardly away from the reservoir to enable the false bottom to cover the vegetable drawer.

Accordingly, it is an object of the present invention to provide a vegetable crisper that maintains the freshness of vegetables placed therein.

It is another object of the present invention to provide a vegetable crisper with a peripheral sprayer through which a fluid may be emitted as a mist for maintaining the hydration of the vegetables therein.

It is another object of the present invention to provide a vegetable crisper that collects in a container separate from a supply container the fluid that is emitted by a sprayer as a mist over vegetables in the crisper, for temporary storage of the collected fluid and subsequent disposal.

It is another object of the present invention to provide a vegetable crisper with a perimetral sprayer for emitting a mist over vegetables therein.

It is another object of the present invention to provide a sprayer at an upper peripheral edge of a vegetable crisper to reduce interference with the available interior space for holding vegetables.

These and other objectives, features and advantages will become apparent from a reading of the following detailed description of the invention and claims in view of the appended drawings.

BRIEF DESCRIPTION OF THE DRAWINGS

FIG. 2 is an partial cross-sectional view of a side of the vegetable crisper illustrated in FIG. 1, with a view of a preferred ribbon-like sprayer seated on an upper peripheral edge.

FIG. 2A is a partial cross-sectional view of an alternate embodiment of the side of the vegetable crisper illustrated in FIG. 2.

FIG. 4 is a partial cut-away view illustrating the connection between the pump and a fluid supply reservoir for the vegetable crisper.

FIG. 6 is a perspective view of the fluid supply reservoir and the fluid collector that connect together as a base for the vegetable crisper illustrated in FIG. 1.

DETAILED DESCRIPTION

Figure 1:
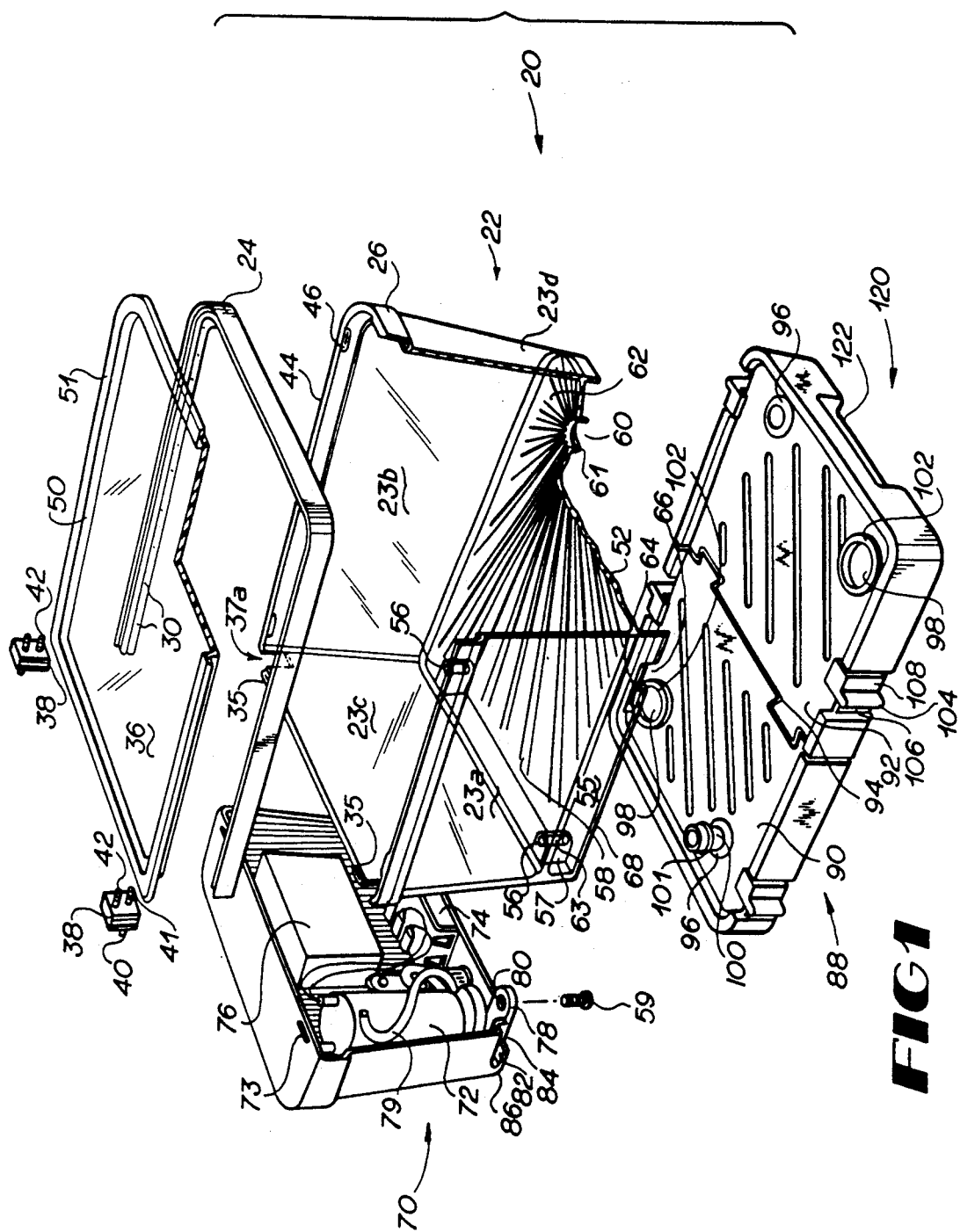
FIG. 1 is an upper and right perspective, exploded view of a vegetable crisper constructed in accordance with the present invention.

Referring now in more detail to the drawings, in which like numerals indicate like parts throughout the several views, FIG. 1 shows an upper and right perspective view of a vegetable crisper 20 constructed in accordance with the present invention, with component parts exploded away for better illustration. Each of the component parts are discussed below. First, the vegetable crisper 20 comprises an open-ended container 22 with four sides 23a, 23b, 23c, and 23d for holding a plurality of vegetables, with a sprayer 24 seated on at least a portion of an upper periphery 26 of the container.

For example, the sprayer 24 in the illustrated embodiment seats on the upper periphery of three sides 23a, 23d, and 23b of the container 22 to define a U-shape. The sprayer 24 emits a misty spray of fluid through orifices onto the vegetables in the container 22 to maintain the freshness of the vegetables therein. The sprayer 24 in a preferred embodiment is an extruded flexible member enclosing at least one elongate tubular tube 28, as illustrated in FIG. 2. The sprayer 24 has a lower projection 27 and an upper knob 29, for a purpose discussed below. A plurality of orifices 30 are formed in the sprayer 24 along at least a portion of the periphery 26. The orifices 30 may be slits or circular openings, and are preferably spaced about 2 to 5 inches apart. The tube 28 communicates a fluid from a supply (discussed below) for emitting through the orifices 30 as a spray into the interior of the container 22. In the illustrated embodiment, the sprayer 24 includes a second tube 34 which contains air. The second tube 34 facilitates seating of a lid 36 on the upper periphery 26 of the sprayer 24.

As best illustrated in cross-sectional view in FIG. 2, the upper periphery 26 of the container 22 defines a substantially L-shape ledge 44 in which the sprayer 24 rests. The lower projection 27 of the sprayer 24 seats in the ledge 44. A plurality of tabs 46 extend inwardly from an inner side of the ledge 44. In the illustrated embodiment, the tabs 46 are positioned near the tangent to the curved corners of the container 22, but other tabs 46 can be disposed between the corners. The tabs 46 overlap an upper portion of the sprayer 24 and press against the knob 29 to hold the sprayer 24 in the ledge 44. The sprayer 24 is thereby mechanically attached to the container 22.

Figure 3:
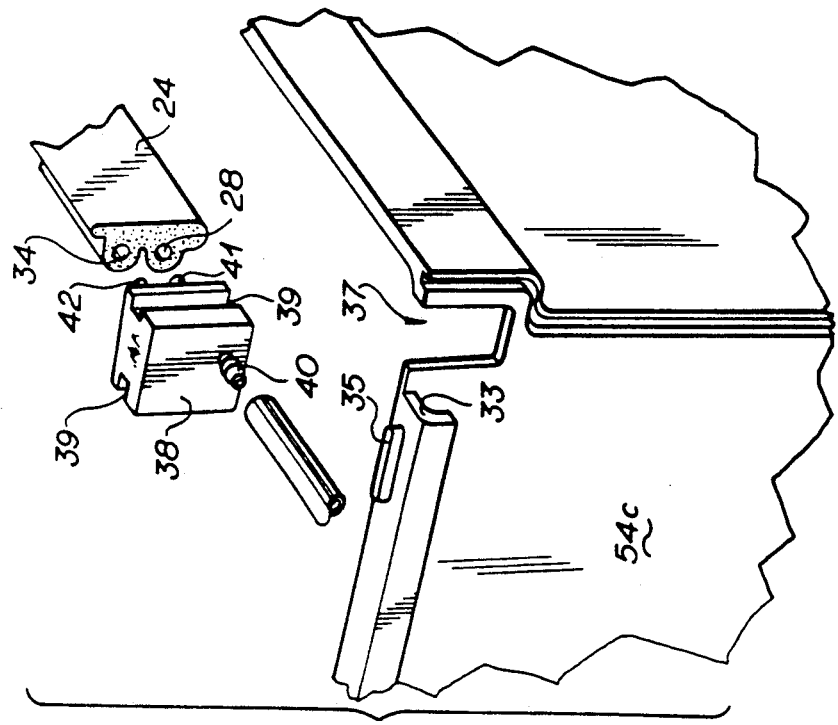
FIG. 3 is a perspective cut-away view of a connector between an outlet hose of a pump and the sprayer for the vegetable crisper illustrated in FIG. 1.

One end of the sprayer 24 communicates with a supply of fluids through a connector 38. As shown in FIG. 3, the connector 38 seats in a notch 37 in an upper corner of one side 23c of the container 22. The notch 37 holds a connector 38 for coupling one of the longitudinal ends of the sprayer 24 to an outlet hose of a pump (discussed below) that communicates fluid to the tube 28. The sides and the bottom of the connector 38 include a groove 39 for receiving the edges of the notch 37 in order to hold the connector in the notch. The connector 38 includes an inlet 40 that extends laterally from a first side. An outlet 41 and a plug 42 extend laterally from a second side. The inlet 40 and the outlet 41 communicate through a bore 43 defined in the connector 38. The plug 42 is closed. The inlet 40, the outlet 41 and the plug 42 are short tubes that are sized for being received by the tubes 28 and 34. The inlet 40 connects to a hose from the pump (discussed below) and the outlet 41 connects to the tube 28 for communicating fluid to the sprayer 24. The plug 42 inserts into the tube 34 to close it at the first end.

The second longitudinal end of the sprayer 24 also receives one of the connectors 38. At the second end, however, the connector 38 is rotated 180 degrees and inserted into a second notch 37a in the upper periphery of the side 23c. The plug 42 inserts into the tube 28 to close it. Pressurized fluid from the pump is thereby forced from the tube 28 through the orifices 30. The open outlet 41 is received by the tube 34, thereby permitting air to flow in and out of the tube, such as when the lid 36 is placed on the container 22 and removed therefrom.

The upper edge of the side 23c includes a transverse L-shaped flange 33 that extends out and downward for increased rigidity of the side. A pair of projections 35 (one of which is illustrated) extends upwardly from an upper surface of the flange for mating engagement with slots in a housing for the pump, as discussed below.

Turning again to FIG. 1, the lid 36 removably sits on the upper edge of the sprayer 24 to close the open container 22. In the illustrated embodiment, the lid 36 is a shallow dish having an upwardly extended perimeter edge 50 and outwardly extending flange 51. The lid 36 pressfits into the L-shaped ledge 44 of the upper periphery 26 of the container 22. The resilient sprayer 24 cooperates with the air-filled tube 34 to receive and cushion the lid 36 on the sprayer 24, and to make at least a partial seal therebetween. In an alternate embodiment illustrated in FIG. 2A, the ledge 44 on two opposing sides 23a and 23b includes an upwardly extending flange 45. A stop 47 extends upwardly from the third side 23c. A ridge 49 on each of two sides of the lid 36 slidably engage a respective one of the flanges 45 to hold the lid on the container 22. The stop 47 prevents the lid 36 from sliding too far on the container 22.

An alternate embodiment of the present invention provides a sprayer head that attaches to the upper periphery of the side 23c, with at least one orifice for spraying fluid across the container 22. In this alternate embodiment, the connector 38 comprises the sprayer head, that is held in the notch 37, preferably centrally disposed on the upper periphery of the side 23c. The inlet 40 connects with the tube from the pump, and the outlet 41 is shaped to emit a stream or spray across the container 22. The lid 36 seats on the ledge 44, but if desired, a flexible gasket could be seated on the ledge for forming a better seal between the lid 36 and the container 22. It is noted here that an air-tight seal between the lid 36 and the container 22 is not necessary or preferred. For example, in the embodiment illustrated in FIG. 1, the sprayer 24 forms a gasket on three of the four sides 23.

The container 22 is adapted for holding a plurality of vegetables. FIG. 2 shows a partial cross-sectional view of the side 23b of the container 22 which includes a bottom 52 from which the four sides 23 extend upwardly. In the illustrated embodiment, the four sides 23 angle outwardly from the bottom 52 to the upper periphery 26. The angle is preferably about 3 degrees from perpendicular. The bottom 52 is vertically spaced from a lower edge 53 of the container 22, and a lower portion 55 of the sides 23 forms a skirt that extends downwardly from the bottom. A plurality of ridges 58 in the bottom 52 radiate from an opening 60 near one corner of the container 22. The ridges 58 define channels 62 therebetween, and the bottom 52 preferably slopes generally from the sides 23 to the opening 60. Fluid that collects on the bottom 52 is thereby directed along the channels 62 to the opening 60 for discharge from the container 22. The ridges 58 further hold the vegetables out of such collected fluids on the bottom 52. An annular neck 61 extends downwardly from the opening 60, for a purpose discussed below.

The container 22 includes a pair of bosses 56 in the lower skirt portion 55 of one side 23c, for a purpose discussed below. Each boss 56 comprises a pair of vertical flanges 57 that extend inwardly from the side 23c under the bottom 52. The boss 56 in the illustrated embodiment includes an open-ended cylinder 63 between the flanges 57. A self-threading screw 59 is threadingly received by the boss 56 as discussed below.

Figure 5:
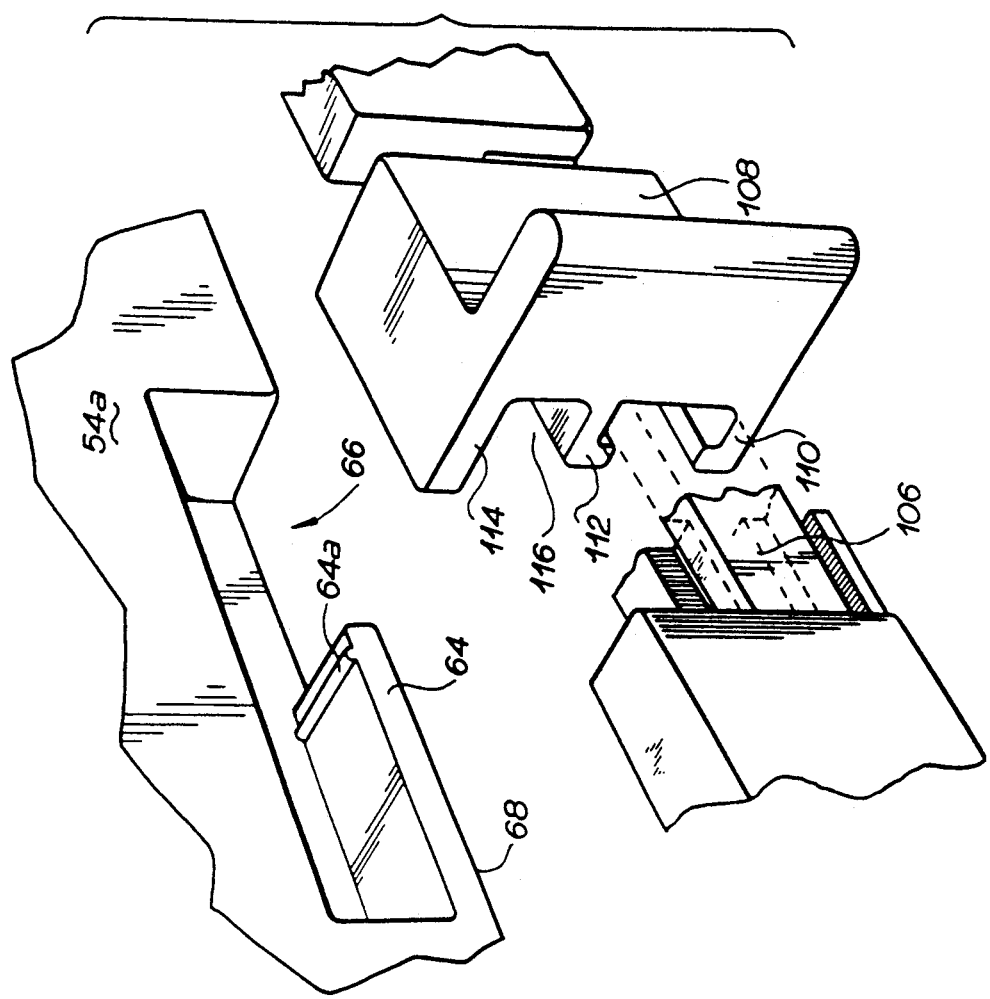
FIG. 5 is a side view of a tab on a container for holding vegetables and a latch on the reservoir that cooperate to interlock the reservoir with the chamber in the vegetable crisper illustrated in FIG. 1.

The container 22 joins to a base 88 of the vegetable crisper 20 with a plurality of tabs 64 (best illustrated in FIG. 5) that engage latches as discussed below. Each tab 64 extends outwardly from a notch 66 in the lower skirt portion 55 on two opposing sides 23a and 23b of the container 22. A ridge 64a acts as a stop to restrict unintentional movement of the latch from a locked position. One side 23a has a single notch 66 and tab 64 while the opposite side 23b has a pair of the notches and tabs. One of the pair are located near the lateral edges of the side 23b. The notch 66 on the side 23a is offset from the middle of the side, and in the illustrated embodiment, is offset from the side 23d approximately one third of the longitudinal length of the container 22.

A housing 70 attaches to one side 23c for enclosing a pump 72, a battery 74, and a controller 76 for operating the vegetable crisper 20. The controller may be of conventional design, having a timer or an electronic logic circuit operating as a timer, to activate the pump 72 at selected intervals. The housing 70 has a pair of tabs 78, each with a hole 80 therethrough for receiving the self-threading screw 59. The tabs 78 extend laterally from a bottom edge of the housing 70. The tabs 78 matingly engage a respective one of the bosses 56 in the lower portion 55 of the side 23c. The screw 59 passes through the hole 80 and threadingly engages the boss 56 to rigidly connect the housing 70 to the container 22. The upper surface of the housing 70 includes a pair of slots 73 which matingly receive the projections 35 on the side 23c of the container 22. This interlocking engagement assists joining the housing to the container 22.

The electrically operated pump 72 is driven by the battery 74 mounted inside the housing 70. In an alternate embodiment, adapters are provided for operating the pump 72 with conventional alternating current or with a 12 volt supply, such as in a car or boat. A first end of a hose 79 connects to the output side of the pump 72 and a second end of the hose connects to the inlet 40 of the connector 38. A second hose 81 extends downwardly from an inlet for the pump 72, as discussed below for communication with the supply of fluid.

A tab 82 extends outwardly from a notch 84 at the lower peripheral edge on a side 86 of the housing 70, for a purpose discussed below. The tab 82 and the notch 84 are similar to the tab 64 and the notch 66 discussed above and illustrated in FIG. 5.

FIG. 4 is a partial cut-away view of the housing 70 showing the connection between the pump 72 and a fluid supply reservoir 90, discussed below. The bottom of the housing 70 includes a raised annular platform 83 having a central hole. An annular funnel 85 having an elongate tube 87 is inverted and inserted into the platform 83 with the tube 87 extending upwardly through the central hole thereof. The hose 79 is received by the tube 87 and connects with the inlet of the pump 72. As discussed below, the funnel 85 receives a tube 100 that extends upwardly from the fluid supply reservoir 90 for communicating fluid to the pump 72. In the illustrated embodiment, the interior of the funnel 85 includes a resilient gasket 89 for sealing the connection between the tube 100 and the funnel.

Returning to FIG. 1, the vegetable crisper 20 also includes a base 88 that comprises the fluid supply reservoir 90 (mentioned above) and a waste fluid collector 92. The reservoir 90 and the collector 92 are substantially rectangular enclosures for holding fluids. The reservoir 90 and the collector 92 twist together with a tongue and groove connection 94 as best illustrated in FIG. 6. The top surface of the reservoir 90 and the collector 92 each include a pair of openings 96 and 98. The tube 100 (best illustrated in FIG. 4) extends upwardly from the opening 96 in the reservoir 90, and is sized for inserting into the annular funnel 85 in the bottom of the housing 70. The diameter of the tube 100 is sized for fitting firmly through the opening 96. The tube 100 is secured in place with an appropriate food-grade adhesive. A screen (not illustrated) may be secured in the tube 100 to filter the fluid communicated to the sprayer 24. An O-ring 101 is received in a groove that extends around the circumference of the tube 100. The O-ring 101 seals the connection between the tube 100 and the annular funnel 85.

The opening 98 preferably has a diameter larger than that of the first opening 96, and is closed by a removable cap 102. The larger opening 98 facilitates filling the reservoir 90 with fluids prior to using the vegetable crisper 20. The larger opening 98 in the collector 92 similarly is closed by a removable cap 102. The larger opening 98 facilitates draining the waste fluids that collect in the collector 92 and washing the collector 92. The smaller opening 96 in the collector 92 receives the annular neck 61 that extends downwardly from the opening 60 in the bottom of the container 24, as discussed above. The annular neck 61 communicates fluids into the collector 92 through the opening 96.

A slidable latch 104 is mounted on each of two opposing sides 106a and 106b of the reservoir 90 and the collector 92. The latches 104 (best illustrated in FIG. 5) engage the tabs 64 and 82 on the container 22 and the housing 70, respectively, to fixedly secure the base 88 to the container 22. One of the latches 104 on the reservoir 90 engages the tab 82 on the housing 70. The other latches 104 on the reservoir 90 and on the collector 92 engage the tabs 64 on the container 22. In the illustrated embodiment, a wide T-flange 106 extends laterally from the container 22. A slidable plate 108 is received on the T-flange. The plate 108 includes three hook-like flanges 110, 112, and 114 that extend laterally from one side of the plate. The flanges 110 and 112 face each other and engage the wings of the T-flange 106 for slidable movement of the plate 108 on the T-flange 106. The flange 114 faces the back side of the flange 112, and cooperates therewith to define a channel 116. The base 88 is secured to the container 22 by moving the plate 108 from a first unlocked position to a second locked position. During this movement, the tabs 64 and 82 are each received in one of the channels 116, thereby securely connecting the container 22 to the base 88.

Figure 5A:
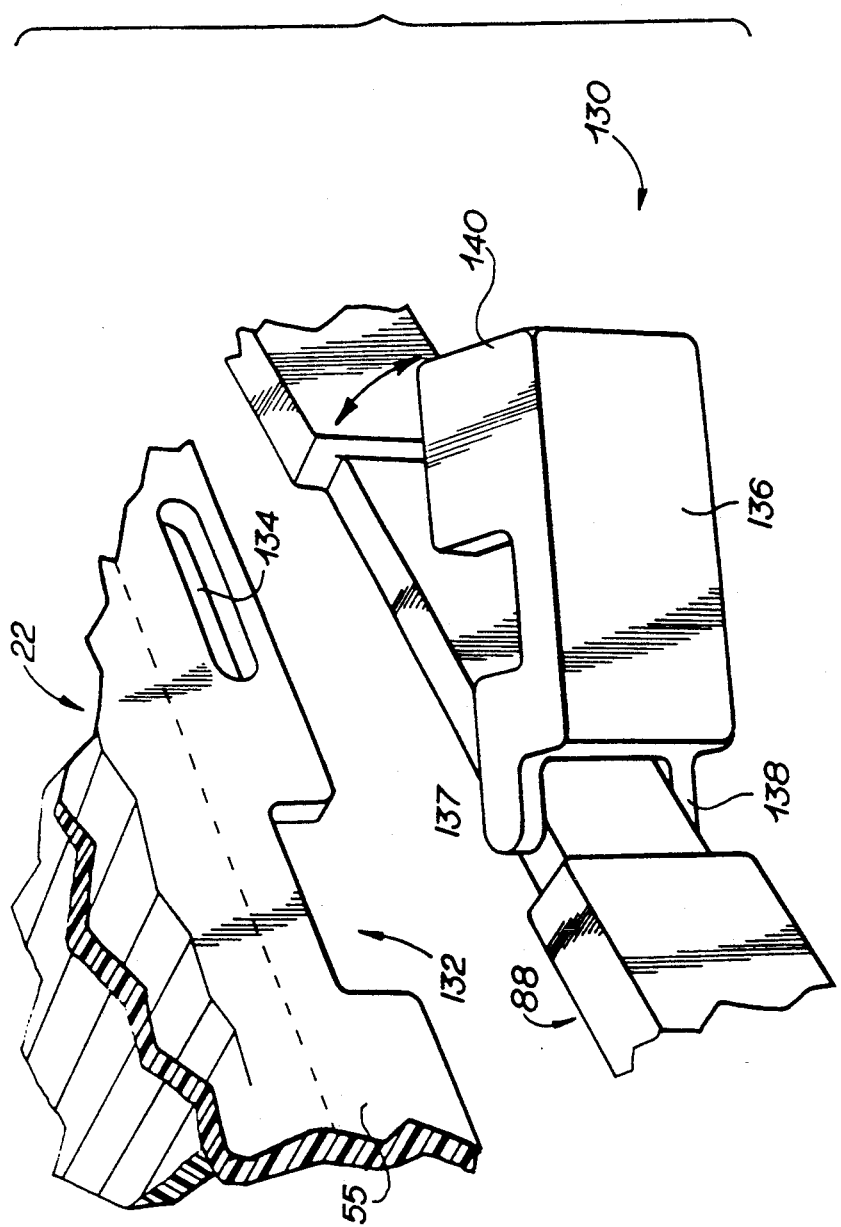
FIG. 5A is a perspective cut-away view of a preferred latch for securing the reservoir to the chamber of the vegetable crisper.

FIG. 5A is a perspective cut-away view of a preferred latch generally designated 130 for connecting the container 22 to the base 88. The lower portion 55 includes a "vertical" notch 132 and a spaced-apart slot 134 instead of the combined "horizontal" notch 66 and tab 64. Thus the side 23a has a single notch 132 and slot 134 while the side 23b has a pair of the notches 132 and slots 134. The housing 70 includes a similar notch 132 and slot 136 instead of the tab 82 and the notch 84 on the lower peripheral edge of the side 86.

The base 88 includes four latches 136. Each latch 136 pivotally connects at 137 in a respective cut-out 138 on the base 88 which cut-out is in correspondence with one of the notches 132 and slots 134. A tongue 140 extends inwardly from the latch 136 for engaging the respective slot 134. The notch 132 permits the latch 136 to pivot at 137 against the lower side 55 of the container 22. The latch 136 pivots from a first outward unlatched position to a second inward latched position. With the container 22 sitting on the base 88, the latch 136 is pivoted and the tongue 140 enters the slot 134 to secure the base 88 to the container 22.

The lateral side 120 of each of the reservoir 90 and the collector 92 includes an exterior handle 122 for hand carrying the assembled vegetable crisper 20.

The vegetable crisper 20 is assembled for use by first placing the sprayer 24 in the ledge 44 and sliding the end of the tube 28 onto the outlet 41 of the connector 38. The second end of the tube 28 is closed by inserting the tube onto the plug 42 of a second connector 38. The hose 79 is connected between the outlet of the pump 72 and the inlet 40 of the first connector 38. The hose 81 is connected between the inlet of the pump 72 and the tube 87 of the inverted funnel 85. The pump 72, the battery 74, and the controller 76 are mounted in the housing 70 and appropriate control wires are connected therebetween to operate the pump and the controller. The container 22 is placed next to the housing 70 with the bosses 56 positioned on the tabs 78 of the housing. The slots 73 in the housing 70 receive the projections 35 on the side 23c. The self-threading screws 59 are then inserted through the hole 80 in the tabs 78 and are threadingly engaged with the bosses 56 to rigidly connect the housing 70 to the side of the container 22.

To use the vegetable crisper 20, the reservoir 90 is first filled with water through the large opening 98. The cap 102 closes the opening 98. The reservoir 90 and the collector 92 are then interlocked with the tongue and groove connector 94. Next, the container 22 with the housing 70 attached thereto is positioned on the reservoir 90 and the collector 92. In the embodiment illustrated in FIG. 1, the tabs 64 and 82 are aligned with the latches 104 and the tube 100 is received in the annular funnel 85 in the housing 70. The plates 108 are moved laterally on the T-flange 106 from a first unlocked position to a second locked position. Each of the tabs 64 are aligned with a respective one of the flanges 106. Sliding the plate 108 engages the tabs 64 and 82 in the channels 116 in order to lock the base 88 to the container 22.

In the embodiment illustrated in FIG. 5A, each of the notches 132 and slots 134 on the container 22 (and the housing 70 attached thereto) align with one of the latches 136 on the base 88. Each latch 136 is pivoted from the first outward position to the second inward position against the lower side 55 of the container 22. As a result, the tongues 140 grippingly enter the slots 134 to secure the base 88 to the container 22.

Vegetables may then be placed on the bottom 52 of the container 52 and the lid 36 is placed on the sprayer 24 to close the container. The vegetable crisper 20 is then operated, preferably by using a switch to start the controller. The pump is then operated at predetermined intervals for a predetermined duty cycle. It is contemplated that a duty cycle of approximately three to eight seconds at about two or three hour intervals wets the vegetables sufficiently to maintain freshness. A second override switch permits a user to activate the pump selectively and independently of the duty cycle. The user may thereby wet the vegetables just after placing them inside the container 22.

The pump 72 in operation draws fluid from the reservoir 90 through the tube 100. The fluid is pumped through the inlet 40 of the connector 38 into the sprayer 24. The fluid is communicated under pressure through the tube 28 and emitted into the container 22 as mist through the orifices 30, thereby wetting the vegetables.

The fluid drips off of the vegetables to the bottom 52. The fluid then flows in the sloping channels 62 to the opening 60 where the fluid is drained through the neck 61 into the collector 92. In this manner, the vegetables are maintained wet. The container 22 and the lid 36 in a preferred embodiment is formed of a transparent plastic to allow inspection of the vegetables in the container and to allow a user to know whether the pump is operating. As needed, the user lifts the lid 36 and removes a selected vegetable.

Periodically the user disassembles the vegetable crisper 20 to re-fill the reservoir 90 and to discharge collected waste fluids from the collector 92. This is done by first detaching the base 88 from the container 22 by releasing the latches 104 from engagement with the tabs 64 and 82. The fluid in the collector 92 is drained through the opening 98 after removing the cap 102. The reservoir 90 is filled, and the vegetable crisper 20 is returned to operation as discussed above.

Figure 7:
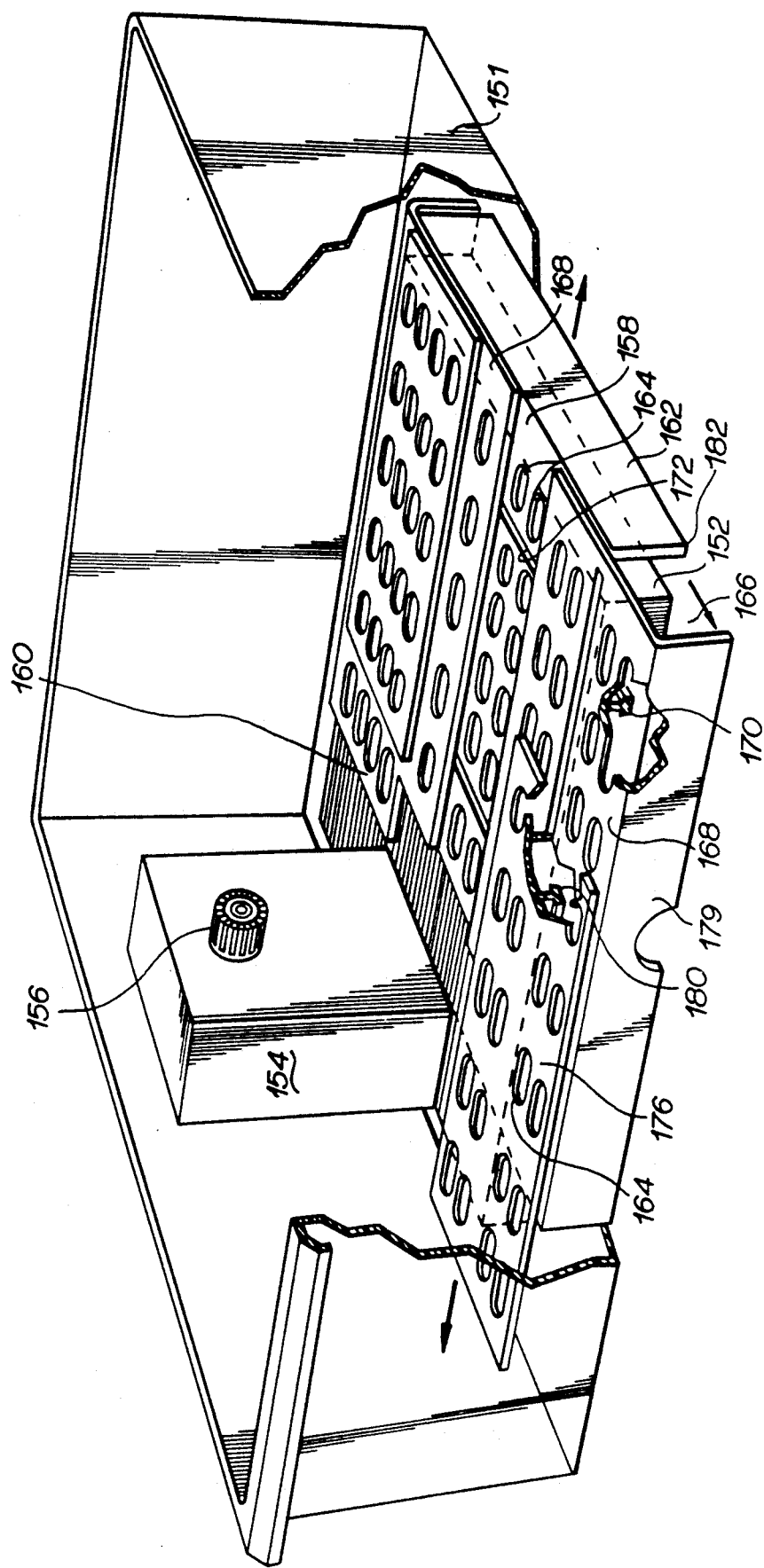
FIG. 7 is a perspective view of an alternative embodiment of the present invention for use in a vegetable drawer of a refrigerator.

FIG. 7 is a perspective view of a vegetable crisper 150 constructed in accordance with the present invention, especially for use in a vegetable drawer 151 of a refrigerator (not illustrated). The vegetable crisper 150 comprises a reservoir 152 for holding a supply of fluid. A housing 154 extends upwardly from the reservoir 152 at a first end. Although not illustrated, the housing 154 encloses the pump 72, the battery 74 and the controller 76, discussed above. The inlet of the pump 72 connects to the tube 100 extending upwardly from the supply reservoir 152, as similarly illustrated in FIG. 4 and discussed above with respect to the reservoir 90 for the embodiment illustrated in FIG. 1. The outlet of the pump 72 connects to a sprayer 156 mounted near an upper end of the housing 159.

A false bottom 158 slidably sits on the reservoir 152 for relative longitudinal movement therewith. Vegetables sit on the upper surface of the false bottom 158. A notch portion 160 enables the false bottom 158 to fit around the housing 154. An elongated flange 162 extends downwardly from an opposite edge of the false bottom 158 for supporting the plate when extended longitudinally from the reservoir 152. The false bottom 158 includes a plurality of spaced apart openings 164. Fluid from the wetted vegetables flows through the openings 164 into a collection area generally designated 166 between the bottom of the vegetable drawer 151 and the false bottom 158. A portion of the false bottom 158 covers the reservoir 152 which preferably is sloped to facilitate drainage of fluid off of the reservoir.

Vegetable drawers in different refrigerators vary in size, so the false bottom 158 preferably is adjustable to cover different surface areas. In the illustrated embodiment, a pair of first plates 168 slidably engage the false bottom 152 for transverse movement therewith. A pair of spaced-apart ribs 170 projects downwardly from a bottom surface of the plate 168. Each of the ribs 170 inserts into a channel 172 in the upper surface of the false bottom 152. The channels 172 guide the lateral travel of first plate 168 with respect to the false bottom 152. The first plate 168 includes a plurality of openings 164 to permit flow of fluid into the collection area 166. An elongated flange 179 extends downwardly from one side of the first plate 168 for supporting the first plate when it is extended laterally from the false bottom 152.

A second plate 176 slidably engages each of the first plates 168 for longitudinal movement therewith. At least one rib 180 extends downwardly from a bottom surface of the second plate. The rib 180 inserts into a channel 182 in the upper surface of the first plate 168. The channel 182 guides the longitudinal travel of the second plate 176 with respect to the first plate 168. The second plate 176 includes a plurality of the openings 164 to permit flow of fluid into the collection area 166.

The operation of the vegetable crisper 150 is similar to that described above for the vegetable crisper 20 illustrated in FIG. 1. The reservoir 152 is filled with water and the housing 154 is attached to the reservoir so that the pump 72 communicates through the tube 100 with the reservoir. The vegetable crisper 150 is placed on the bottom of the vegetable drawer 151.

The pair of first plates 168 are joined to the false bottom 158 by inserting the ribs 170 into the channels 172. One of the second plates 176 is joined to each of the first plates 168 by insert the rib 180 into the channel 182. The false bottom 158 is placed on the reservoir 152 in the vegetable drawer 151. The false bottom 158 is then moved longitudinally with respect to the reservoir 152 until the flange 162 is next to the end wall of the vegetable drawer 151. The first plates 168 are then moved laterally with respect to the false bottom 158 until the flanges 174 are next the respective side wall of the vegetable drawer 151. The second plates 176 are then moved longitudinally with respect to the first plates 168 towards the end wall of the vegetable crisper near the housing 154. In this manner, the open areas of the vegetable drawer 151 are covered by the false bottom 158 and the plates 168 and 176 to provide a surface on which vegetables may be placed.

The controller for the pump 72 is then started. At predetermined intervals, the pump 72 is operated to communicate fluid from the reservoir 152 to the sprayer 156. The fluid is sprayed over vegetables in the vegetable drawer for wetting thereof to maintain freshness. The fluid drips through the openings 164 into the collection area 166 between the vegetable crisper 151 and the surface defined by the false bottom 158 and the plates 168 and 176. On occasion, the vegetable drawer 151 is removed from the refrigerator. The vegetable crisper 150 is removed and the collected fluid poured out of the vegetable drawer 151. The reservoir 152 is refilled and replaced in the vegetable drawer 151 as discussed above.

In an alternate embodiment (not illustrated), the false bottom includes a pair of guides extending upwardly on the transverse sides. The guides slidingly receive the first plate 168 for relative transverse movement therewith. The guides are facing L-shaped flanges which each receive an edge of the first plate. The first plate 168 further includes a pair of similar guides that extend upwardly along the longitudinal edges of the first plate. The guides slidingly receive the second plate 176 for relative longitudinal movement therewith.

The specification has thus described various embodiments, including a preferred embodiment, of the present invention, including the assembly and use thereof. It is to be understood, however, that numerous changes and variations may be made in the construction of the present invention. It should therefore be further understood that modification of the present invention may be made without departing from the scope thereof as set forth in the appended claims.

I claim:
1. A vegetable crisper, comprising:
a chamber for holding vegetables;
a reservoir for a supply of fluid;

an elongated tube for passing the fluid from the reservoir to at least one orifice in the tube that attaches to an upper peripheral edge of the chamber; and means for communicating the fluid under pressure to the tube for a predetermined period at a predetermined interval of time, whereby the fluid being communicated to the tube is emitted through the orifice into the chamber.

2. The vegetable crisper as recited in claim 1, wherein the fluid is water.

3. The vegetable crisper as recited in claim 1, wherein the chamber has a ribbed bottom surface for supporting the vegetables above the fluid that collects thereon.

4. The vegetable crisper as recited in claim 1, wherein the chamber has a bottom surface sloped toward an outlet for discharging fluid therefrom.

5. The vegetable crisper as recited in claim 4, wherein the bottom surface is ribbed for supporting the vegetables above the fluid that collects thereon.

6. The vegetable crisper as recited in claim 1, further comprising a removable lid received on the ribbon for closing the open upper end of the chamber.

7. The vegetable crisper as recited in claim 6, wherein the lid further comprises a plate slidable from a first position that closes a port in the lid to a second position that opens the port, whereby the port being opened provides access to the chamber.

8. The vegetable crisper as recited in claim 6, wherein the lid is slidably received by upwardly extending flanges on the upper peripheral edge of the chamber.

9. The vegetable crisper as recited in claim 1, wherein the tube comprises a ribbon that further comprises a second discrete tube for receiving a second fluid.

10. The vegetable crisper as recited in claim 9, wherein the second fluid is air.

11. The vegetable crisper as recited in claim 1, wherein said communicating means comprises:

a pump for communicating fluid from the reservoir to the sprayer; and means for operating the pump periodically for a predetermined time.

12. The vegetable crisper as recited in claim 11, wherein the pump is electrically powered.

13. The vegetable crisper as recited in claim 1, further comprising a waste fluid reservoir having at least one port for receiving fluid discharged through the orifices into the chamber.

14. The vegetable crisper as recited in claim 13, wherein the waste fluid reservoir detachably connects to the reservoir.

15. The vegetable crisper as recited in claim 13, wherein the waste fluid reservoir further comprises means for detachably connecting the waste fluid reservoir to the chamber.

16. The vegetable crisper as recited in claim 15, wherein the connecting means comprises:

a latch operatively attached to the water fluid reservoir; and a catch attached to the chamber for engaging with the latch.

17. An apparatus for insertion into a vegetable crisper drawer of a refrigerator for maintaining the freshness of vegetables held therein, comprising:

a closable container for holding a supply of fluid;

a housing extending vertically from one end of the closable container and having a sprayer attached to an upper end of the housing;

the housing enclosing means for communicating the fluid under pressure to the sprayer periodically for a predetermined period of time; and a false bottom having openings attached to an upper surface of the closable container for holding vegetables, whereby the vegetables, being placed on the false bottom, are wetted by the fluid emitted from the sprayer.

18. The apparatus as recited in claim 17, further comprising means for adjusting the surface area of the false bottom, whereby the apparatus, being adjustable, fits different size areas of vegetable drawers.

19. The apparatus as recited in claim 18, wherein the means for adjusting comprises slidably engaging the false bottom with the closable container for relative movement therewith.

20. The apparatus as recited in claim 19, wherein the false bottom further comprises a flange extending downwardly from an edge of the false bottom, whereby the false bottom, being extended from the closable container, is supported by the flange.

21. The apparatus as recited in claim 19 further comprising at least one first plate slidingly engaged with the false bottom for lateral movement therewith.

22. The apparatus as recited in claim 21, wherein the first plate further comprises a flange extending downwardly from an outside edge of the false bottom, whereby the first plate, being extended from the false bottom, is supported by the flange.

23. The apparatus as recited in claim 21, further comprising a second plate slidingly engaged with the first plate for longitudinal movement therewith.

24. A vegetable crisper, comprising:

a chamber for holding vegetables;

a reservoir for a supply of fluid;

a sprayer attached to an upper peripheral edge of the chamber and having a plurality of orifices spaced along at least a portion of the peripheral edge;

means for communicating the fluid under pressure to the sprayer for a predetermined period at a predetermined interval of time; and a waste fluid reservoir detachably connected to the chamber and having at least one port for receiving fluid discharged through the orifices into the chamber, whereby the fluid being communicated to the sprayer is emitted through the orifices into the chamber.

25. The vegetable crisper as recited in claim 24, wherein the connecting means comprises:

a latch operatively attached to the water fluid reservoir; and a catch attached to the chamber for engaging with the latch.

* * * * *